United States Patent [19]

Compton

[11] Patent Number: 4,813,839
[45] Date of Patent: Mar. 21, 1989

[54] PORTABLE TRUCK AND RAILROAD CAR LOAD CONVEYER

[76] Inventor: Ira Compton, 2434 Dayton Rd., Chico, Calif. 95928

[21] Appl. No.: 126,427

[22] Filed: Nov. 30, 1987

[51] Int. Cl.$^4$ ............................................. B65G 21/14
[52] U.S. Cl. .................................. 414/345; 414/398; 414/574; 414/528; 198/311; 180/209
[58] Field of Search ............... 414/343, 345, 398, 573, 414/574, 528; 198/311; 180/199, 209; 280/43.23, 43.24

[56] References Cited

U.S. PATENT DOCUMENTS

| | | |
|---|---|---|
| 733,430 | 7/1903 | Schroeder et al. ............ 414/574 X |
| 2,387,189 | 10/1945 | Steinmetz . |
| 2,632,556 | 3/1953 | Alpers et al. . |
| 2,875,888 | 3/1959 | Swain et al. . |
| 3,067,858 | 12/1962 | Loosli . |
| 3,134,480 | 5/1964 | Loosli . |
| 3,154,189 | 10/1964 | O'Hanlon . |
| 3,378,152 | 4/1968 | Warner ................................. 414/574 |
| 3,391,776 | 7/1968 | Hancock et al. ............... 180/209 X |
| 3,552,546 | 1/1971 | Rath . |
| 3,563,364 | 2/1971 | Arnot . |
| 4,350,241 | 9/1982 | Wenzel . |
| 4,591,432 | 5/1986 | Hartl . |
| 4,669,674 | 6/1987 | Oldengott et al. ............ 414/574 X |

FOREIGN PATENT DOCUMENTS

| | | |
|---|---|---|
| 1065784 | 6/1979 | Canada . |
| 2135409 | 1/1973 | Fed. Rep. of Germany ...... 414/343 |

Primary Examiner—Frank E. Werner

[57] ABSTRACT

A portable self-powered load conveyer is structured on a wheeled frame with a drive-over ramp feature allowing ground level loading of bulk materials. Pivotally attached to the wheeled frame, is an elevator with height adjustment mechanics for depositing the bulk materials as required at a higher level. The wheeled frame is equipped with retractable street wheels and a tow hitch for moving the conveyer from job site to job site by towing. Dual sets of positionable wheels, also on the frame, allows backward, forward, turning, and sideways self-powered movement of the conveyer assemblage around the job site. The self-powering is accomplished by an installed internal combustion engine and controlled hydraulic pressurized mechanics. The control arrangement allows for the entire conveyer assemblage to be managed by a single operator.

11 Claims, 8 Drawing Sheets

PORTABLE TRUCK AND RAILROAD CAR LOAD CONVEYER

BACKGROUND OF THE INVENTION

1. Field of the Invention

This invention relates to mobile elevating conveyers of the type used commonly for unloading bulk materials from a bottom dump carrier and loading the bulk materials into the hopper of a second transport vehicle. These conveyers are also used to unload bulk materials from a carrier and to stockpile the bulk materials in a desired ground location or inside of a storage shelter. The bulk materials handled may be organic or inorganic such as rice and nuts or sand and gravel.

2. Description of the Prior Art

A study of the past-art patents in classes and subclasses 198/304, 306, 311, 313, and 318 does not disclose a self-propelled elevator-conveyer of similar disposition to the present invention. The patents examined which seemed most pertinent to the present invention included the following:

U.S. Patents numbered:
U.S. Pat. No. 2,387,189
U.S. Pat. No. 2,632,556
U.S. Pat. No. 2,875,888
U.S. Pat. No. 3,067,858
U.S. Pat. No. 3,134,480
U.S. Pat. No. 3,143,189
U.S. Pat. No. 3,552,546
U.S. Pat. No. 3,563,364
U.S. Pat. No. 4,350,241
U.S. Pat. No. 4,591,432
Canadian Pat. No.:
1,065,784

None of the devices disclosed in the above listed patents were of a nature which would interfere with the successful prosecution for letters patent on the present invention.

SUMMARY OF THE INVENTION

To overcome many operational deficiencies seen in the past-art patents, the present invention is particularly directed towards a self-propelled apparatus with controls for complete management of the conveyer by a single operator. Mechanics are included for raising and lowering the load angle of the elevator, raising and lowering the support structure, maintaining vertical alignment on uneven ground, being self-powered, able to move omni-directional by means of mechanics in a specialized wheel assemblage; and equipped with a low-profile drive-over loading ramp.

Therefore, it is a primary object of the present invention to provide a self-propelled elevator conveyer with multi-use provisions.

Another object of the invention is to provide a load conveyer with a low profile drive-over loading ramp which can be readily positioned for accepting bottom dump loads from trucks, from railroad cars, and from other conveyances.

A further object of my invention is to provide a load conveyer with means for adjusting the angle of the elevating belt through lift mechanics applied to the belt support super-structure from a support base affixed with a wheel assemblage.

A still further object of this invention is to provide a self-powered load conveyer with a wheel assemblage affixed with mechanics for raising and lowering the base support structure to allow omni-directional movement of the entire elevator structure.

Another object of the present invention is to provide a truck and railroad car load conveyer with road-type tired street wheels and a towing attachment so the conveyer can be conveniently towed by truck from job site to job site.

A further objective of the invention is to provide a self-powered load conveyer with mechanics and controls so the conveyer assemblage can be completely operated at the job site for movement and for elevating loads by a single operator.

Many other objects and the advantages of my invention will become obvious by reading the specification and considering the numbered parts listed in conjunction with like numbered parts shown on the drawings.

Figure 1:
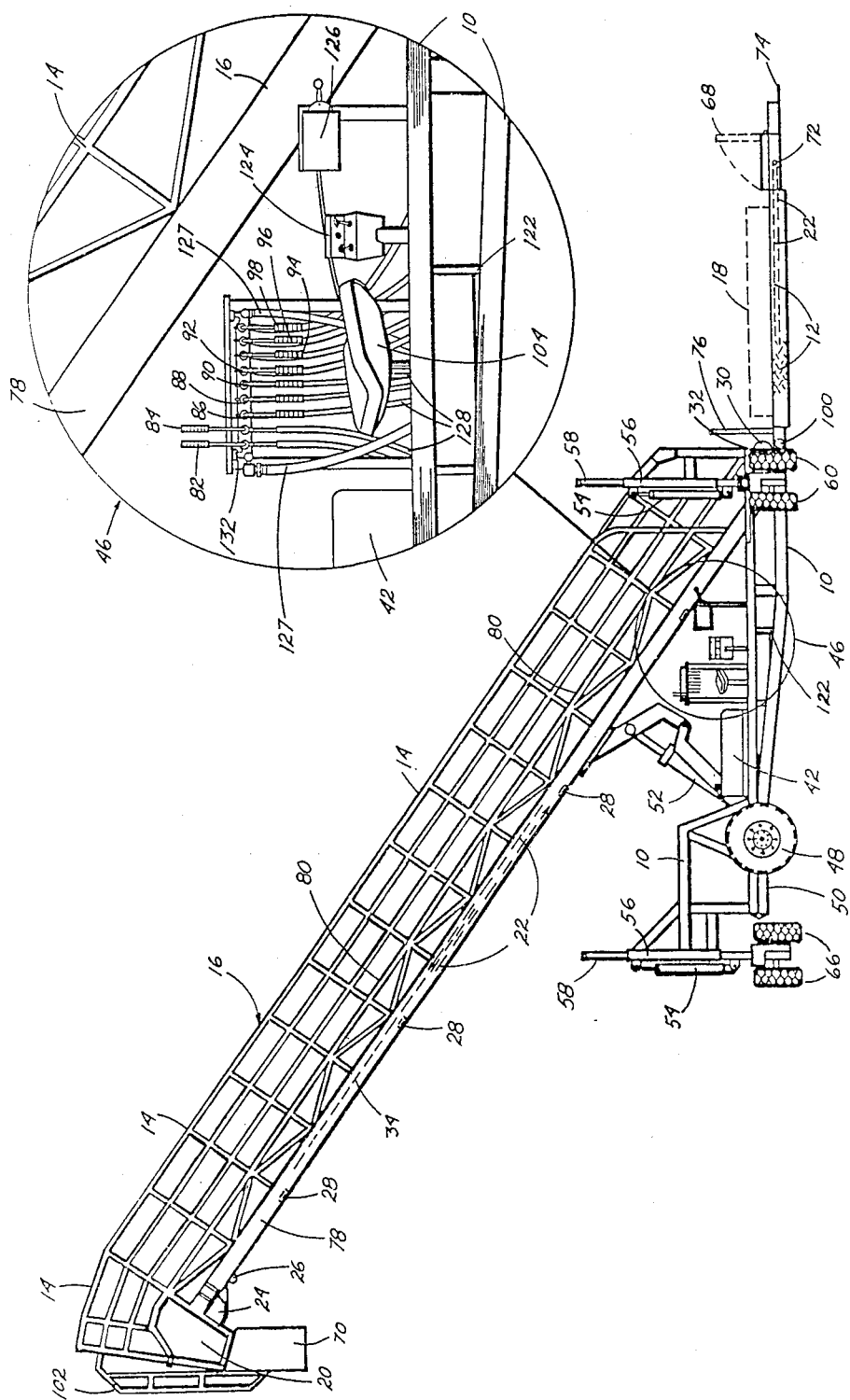
FIG. 1 shows the load conveyer assemblage of the present invention in a side view with an enlargement of the control station.

DRAWING REFERENCE NUMERALS 10 main frame
12 drive-over ramp
14 hand railing and support bracing for elevator
16 elevator
18 ramp receiver side panels
20 hooded chute
22 conveyer belt
24 head roller
26 nose roller
28 return belt retainers
30 tired idler wheel 32 slide shoes
34 conveyer belt support panel
36 main power unit, internal combustion engine
38 hydraulic pump
40 hydraulic supply tank
42 fuel supply tank
44 hydraulic motor
46 control station
48 street wheels
50 wheel set hydraulic cylinder
52 elevator positioning hydraulic cylinder
54 vertical wheel positioning hydraulic cylinders
56 vertical slide wheel lift frames
58 vertical slide wheel supports
60 free pivoting dual wheel set
62 hydraulically motored dual wheel set
64 hydraulically motored dual wheel set
66 rigidly positioned dual wheel set
68 pivotal idler roller
70 chute boot
72 rear idler roller
74 transport pull hitch
76 side panels control lever
78 two-sided elevator base frame
80 elevator belt cover and catwalk
82 forward move hydraulic control valve
84 reverse move hydraulic control valve
86 wheel set 20 forward/reverse control valve
88 wheel set 27 forward/reverse control valve
90 elevator and catwalk repositioning control valve
92 street wheels up/down hydraulic control valve
94 dual wheel sets 28 and 29 up/down control valve
96 dual wheel set 27 up/down control valve
98 dual wheel set 26 up/down control valve
100 elevator to main frame pivotal hinge link
102 optional utility ladder
104 operator's seat
106 up and down movement indicator
108 directional movement indicators
110 turning movement indicators
112 bottom dump bulk carrier truck
114 truck hopper
116 truck bottom dump chute
117 bottom dump railroad hopper car
118 railroad hopper car dump chute
120 bulk materials
122 control stand platform
124 internal combustion engine control
126 rpm regulator throttle
127 hydraulic input lines
128 hydraulic feeder lines
130 radiator
132 control valve panel

DESCRIPTION OF THE PREFERRED EMBODIMENT

Referring now to the drawings at FIG. 1 where the portable truck and railroad car load conveyer constituting the present invention is shown in a side view of the load conveyer assemblage and includes an enlarged view of the control station 46. In FIG. 1, main frame 10, constructed of steel tubing, is the basic conveyer support structure. Drive-over ramp 12, the load receiver, is a ground oriented continuation of main frame 10. Elevator 16 is the material moving structure and is connected to main frame 10 at a material receiving end by elevator to main frame pivotal hinge link 100 and the opposite end, the material distributing end, is free to be moved upwards and downwards by elevator positioning hydraulic cylinder 52 controlled at control station 46 by elevator and catwalk repositioning valve 90.

Conveyer belt 22 is affixed longitudinally in two-sided elevator base frame 78 to ride freely along conveyer belt support panel 34 as a continuous loop around head roller 24 and rear idler roller 72 in the end section of drive-over ramp 12. Idler roller 72 is accessible through protective cover 68. Tired idler wheel 30, bracketed to revolve and wade through conveyed material in the mouth of the material receiving end of elevator 16, presses down and holds conveyer belt 22 properly positioned. Conveyer belt 22 returning under support panel 34 is confined closely between the two sections of two-sided elevator base frame 78 by nose roller 26, return belt retainers 28, and pivotal idler roller 68. Conveyer belt 22, manufactured of suitable belting material, is fastened end-to-end into a continuous loop. A variety of cleating fixtures are designed into the outward faced load conveying side and the inner faced side is frictionally finished for legged matching to a similarly finished head roller 24. Conveyer belt 22 is motivated by hydraulic motor 44 attached to head roller 24 positioned upwardly at the movable material distributing end of elevator 16 to two-sided elevator base frame 78 at the terminal end. Head roller 24 is lagged outside for friction mating with and the powering of conveyer belt 22. Hydraulic motor 44 supplied by hydraulic feeder line 128 powers head roller 24 and is the prime mover for conveyer belt 22. Hooded chute 20 adjacent head roller 24 directs conveyed material into truck hopper 114 through chute boot 70, a rugged flexible fabric tubular open-ended sack, which contains product flow and minimizes dust migration.

Figure 3:
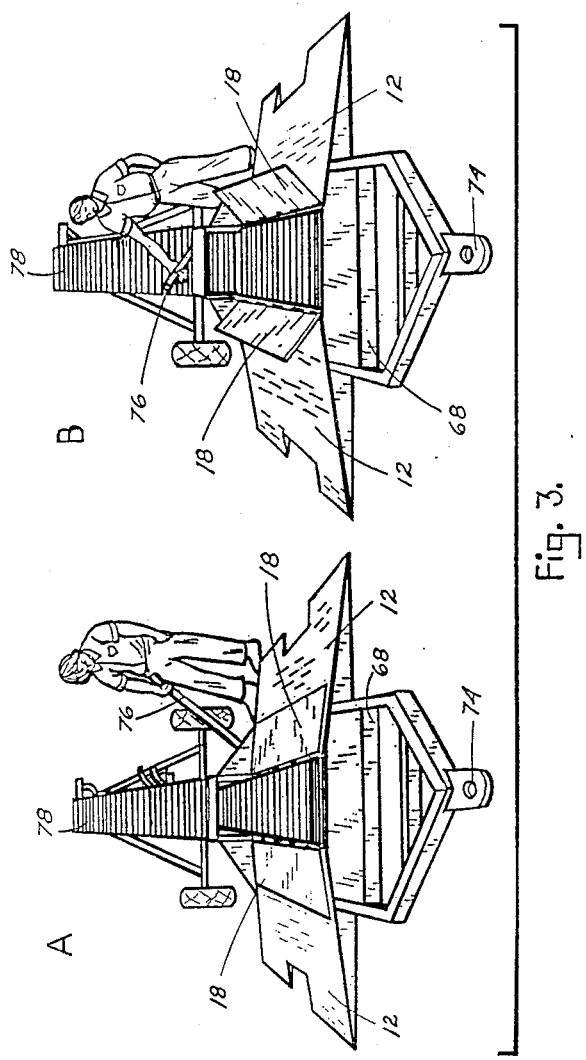
FIG. 3 illustrates the operational mechanics of the drive-over ramp unique to the present invention with A showing the receiver side panels down in drive-over position and B showing the receiver side panels up for material retention on the belt.
Figure 4:
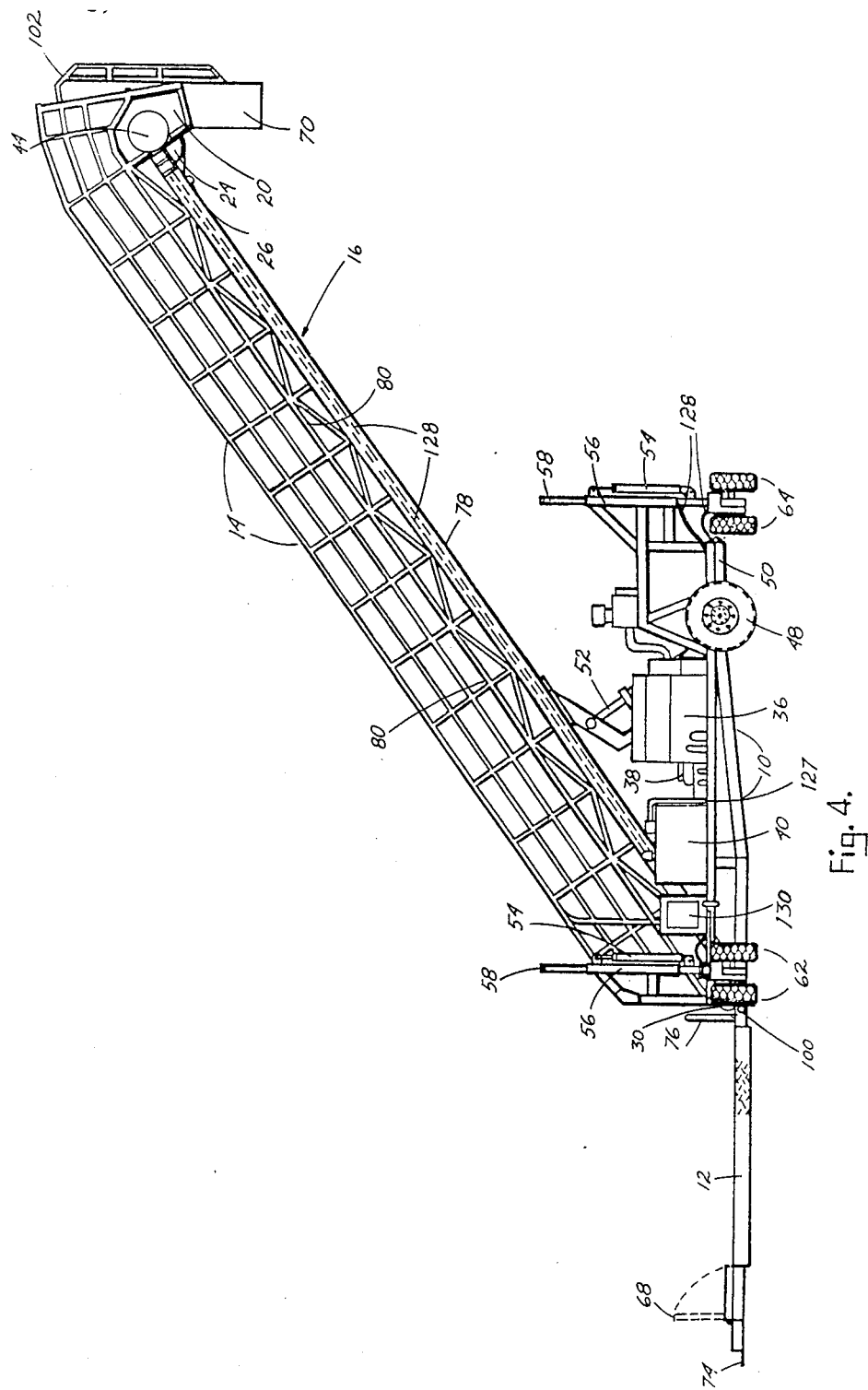
FIG. 4 shows the load conveyer assemblage of FIG. 1 in a reverse side view illustrating the self-propelling powering means, an internal combustion engine, and the pressurized fluid station supplying hydraulic fluid for motor and ram operations.

Tired idler wheel 30 is bracket mounted to two-sided elevator base frame 78 at the elevator feeder end of drive-over ramp 12 and wades through materials passing along conveyer belt 22 to hold the center of conveyer belt 22 down at the beginning of the incline. Also, to hold the sides of conveyer belt 22 down, slide shoes 32 are installed in the two-sided elevator base frame 78 adjacent idler wheel 30. Drive-over ramp 12 is a ground paralleling pan-type material receiver attached as a continuation of main frame 10 at the loading end of elevator 16. Conveyer belt 22 is exposed for material loading in the opened top of drive-over ramp 12. Ramp receiver side panels 18 controlled by side panel control lever 76 can be lowered when bottom dump bulk carrier truck 112 is driven over drive-over ramp 12 to position truck bottom dump chute 116 for discharging bulk materials 120. After truck bottom dump chute 116 is in place, ramp receiver side panels 18 are raised upwards by side panel control lever 76 to keep dumping bulk materials 120 directively contained on conveyer belt 22. The drawings at FIG. 3 illustrate drive-over ramp 12 with side panel control lever 76 positioned so ramp receiver side panels 18 are in the down or drive-over position at A. At B in FIG. 3, side panel control lever 76 is in position so ramp receiver side panels 18 are in the raised attitude to provide a hopper-like director for materials deposited on conveyer belt 22.

Figure 2:
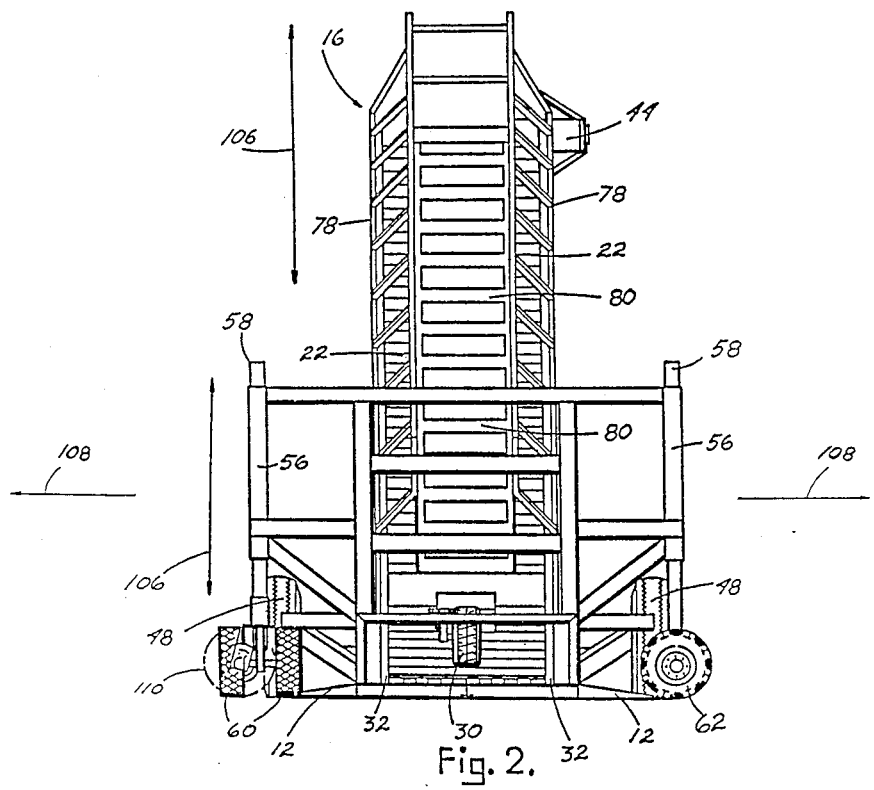
FIG. 2 is a frontal view of the conveyer towards the drive-over ramp at the ramp-end lift frame showing the elevator raised and the top positioned catwalk.

Elevator cover and catwalk 80, a protective covering for materials moving up on conveyer belt 22 and a walkway for the operator, can be seen best in FIG. 2. Hand railing and support bracing for elevator 14 are dual purpose in that supporting framework for elevator 16 is included in the hand rails and the catwalk is available so the operator can walk up to the load depositing end of the raised elevator 16 using the hand rail and then climb down by optional utility ladder 102 to the top of gondola railroad car 117 to open cargo receiving tops. With other types of elevator equipment, the operator would be obliged to scale the railroad car sidewall to gain the hopper top.

Figure 6:
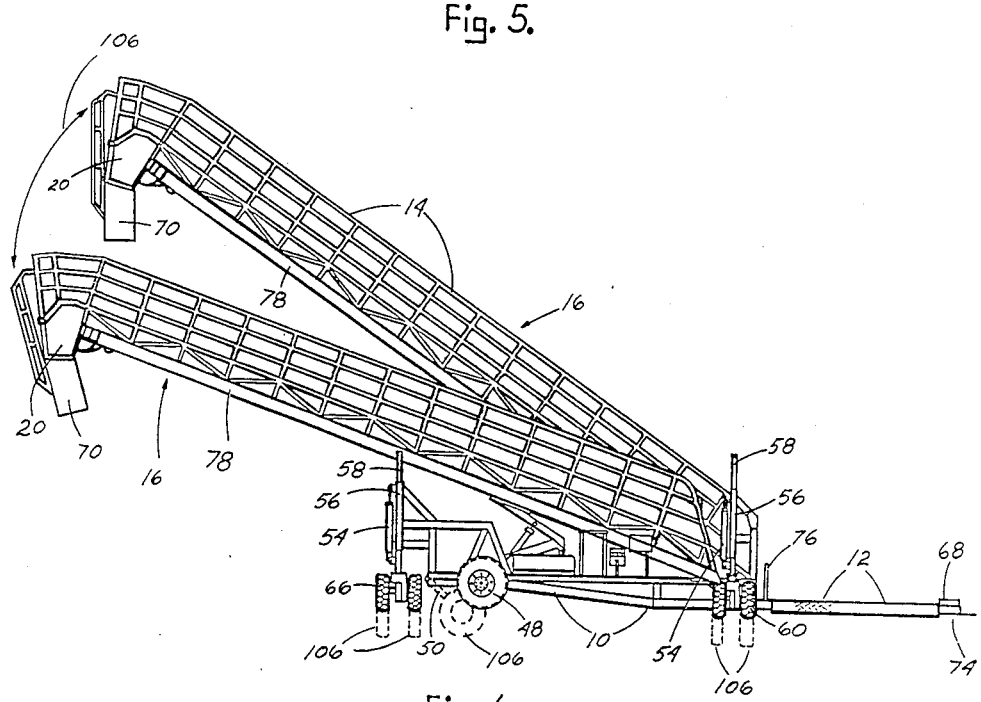
FIG. 6 shows the load conveyer assemblage of FIG. 1 illustrating the elevator raising and lowering mechanical capabilities.

The portability and versatility of the present invention can be understood by examining numbered parts in the drawings illustrating the main power unit 36, an internal combustion engine, preferably diesel; hydraulic pump 38, a positive displacement type fluid pump solidly coupled to main power unit 36; hydraulic supply tank 40; fuel supply tank 42; hydraulic motor 44, driver for conveyer belt 22; wheel set hydraulic cylinder 50 which raises and lowers street wheels 48. Hydraulic fluid is cooled in radiator 130 and the main powering unit, internal combustion engine 36, as illustrated in the drawings, is an air-cooled diesel engine. The raising and lowering of the discharge end of elevator 16, accomplished by elevator positioning hydraulic cylinder 52, is illustrated in FIG. 6 and shown by up and down movement indicators 106. The crab-like versatility in the ground movement capabilities of the present invention is shown best in FIG. 7 by directional movement indicators 108 and turning movement indicators 110.

The variety of movements the load conveyer of the present invention is capable of is accomplished by hydraulically operated sets of wheels which can be raised and lowered and powered as need. The mechanics for the forward-backwards, circling, and sideways movements are included in vertical wheel positioning hydraulic cylinders 54; vertical side wheel lift frames 56; vertical side wheel supports 58; free pivoting dual wheel set 60; hydraulically motored dual wheel set 62; hydraulically powered dual wheel set 64; and rigidly positioned dual wheel set 66. The hydraulic motors and cylinders are controlled at control station 46 as illustrated enlarged in FIG. 1. The controls include forward move hydraulic control valve 82, reverse move hydraulic control valve 84, wheel set 20 forward/reverse control valve 86, wheel set 27 forward/reverse control valve 88, elevator and catwalk repositioning control valve 90, street wheels 48 up/down hydraulic control valve 92, dual wheel sets 28 and 29 up/down control valve 94, dual wheel set 27 up/down control valve 96; and dual wheel set 26 up/down control valve 98. Pressurized hydraulic input lines 127 supply activated hydraulic fluid to the control valve panel 132. Hydraulic feeder lines 128 distribute controlled pressurized hydraulic fluid to the various hydraulic motors and hydraulic cylinders or rams.

An operator's seat 104 and a control stand platform 122 are included at control station 46. All necessary functional controls are positioned at control station 46, see FIG. 1 enlargement of control station 46, and one uniqueness of this device is that on the job site, all movements of the load conveyer can be conducted by a single operator.

Figure 5:
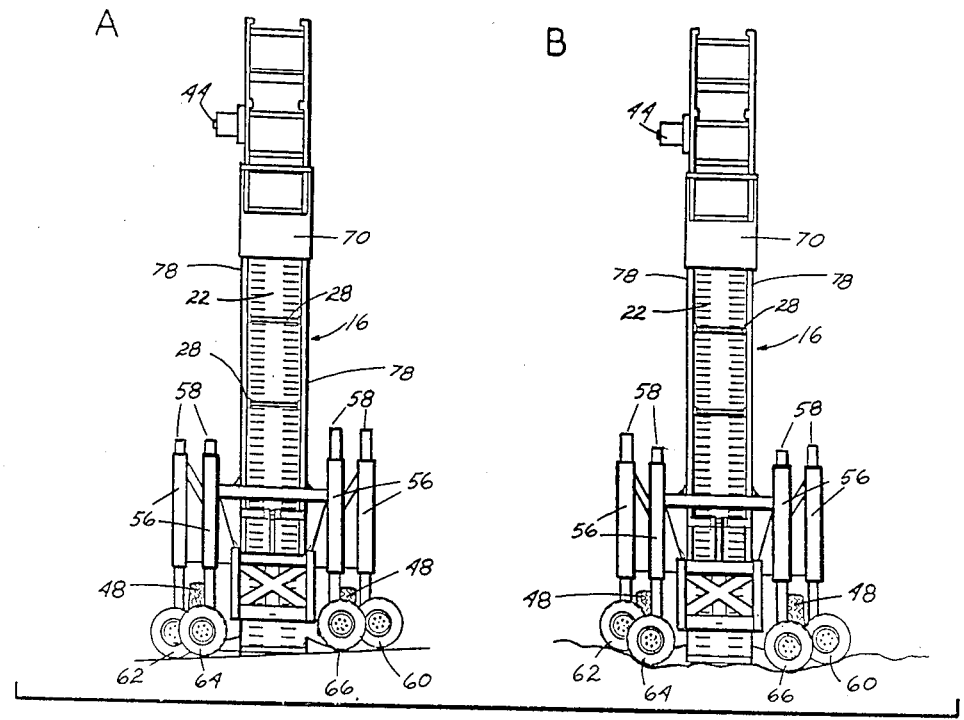
FIG. 5 shows the load conveyer in a view oppositely from FIG. 2 illustrating the underside of the raised elevator section with the rear lift frame predominate showing how the wheels of the rear and the front lift frames can cooperatively adjust for one ground level and ground surface at A and for another at B.
Figure 7:
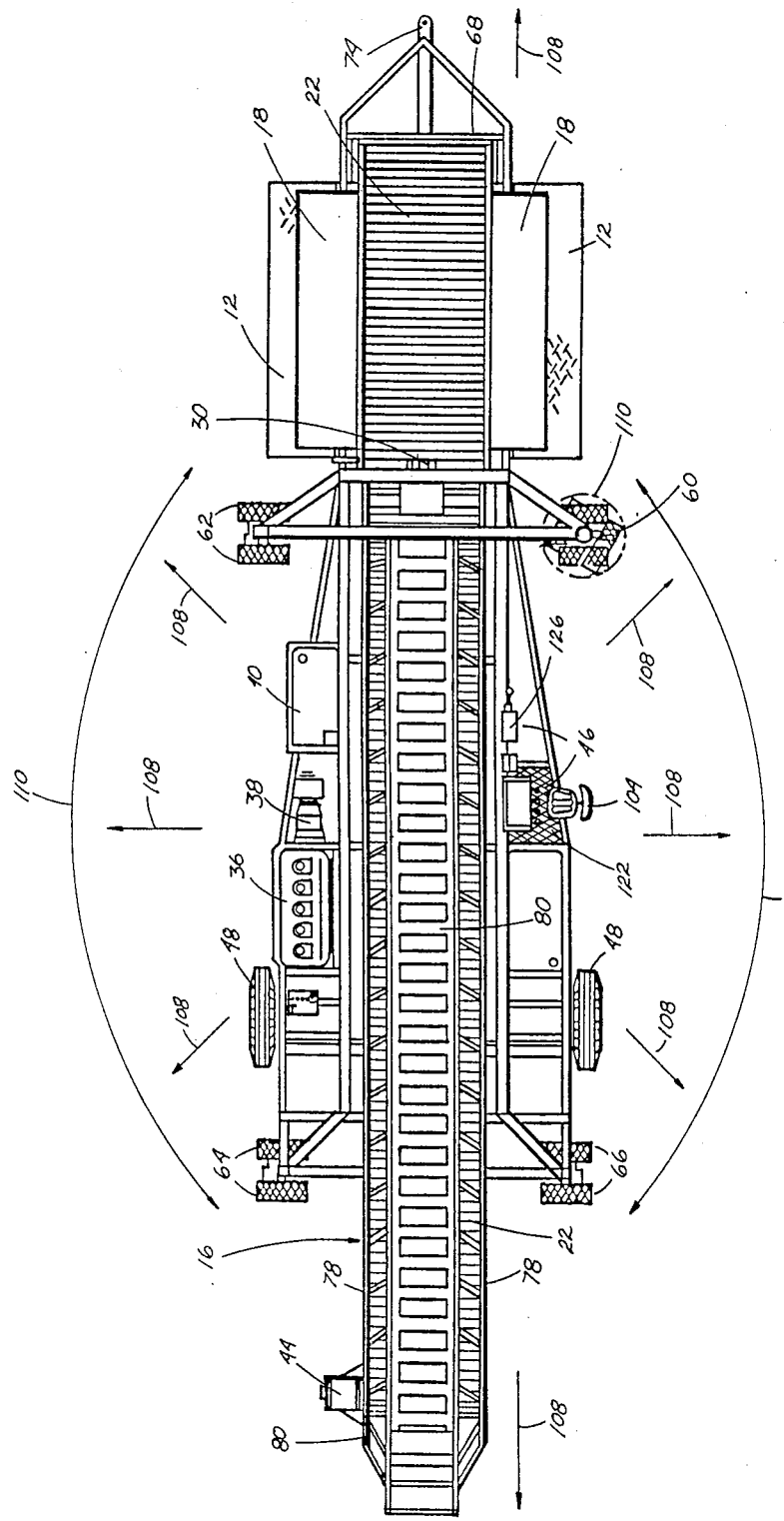
FIG. 7 shows the load conveyer assemblage of the present invention in a top plan view.

The versatility of the dual wheel sets in vertically positioning elevator 16 on uneven ground is illustrated in FIG. 5 on slanted ground at A and on uneven ground at B. In FIG. 7, a top plan view of the loader assemblage, the various numbered parts can be seen with directional movement indicators 108 and turning movement indicators 110 showing the different ways the entire machine can accomplish self-propelled movements.

Figure 8:
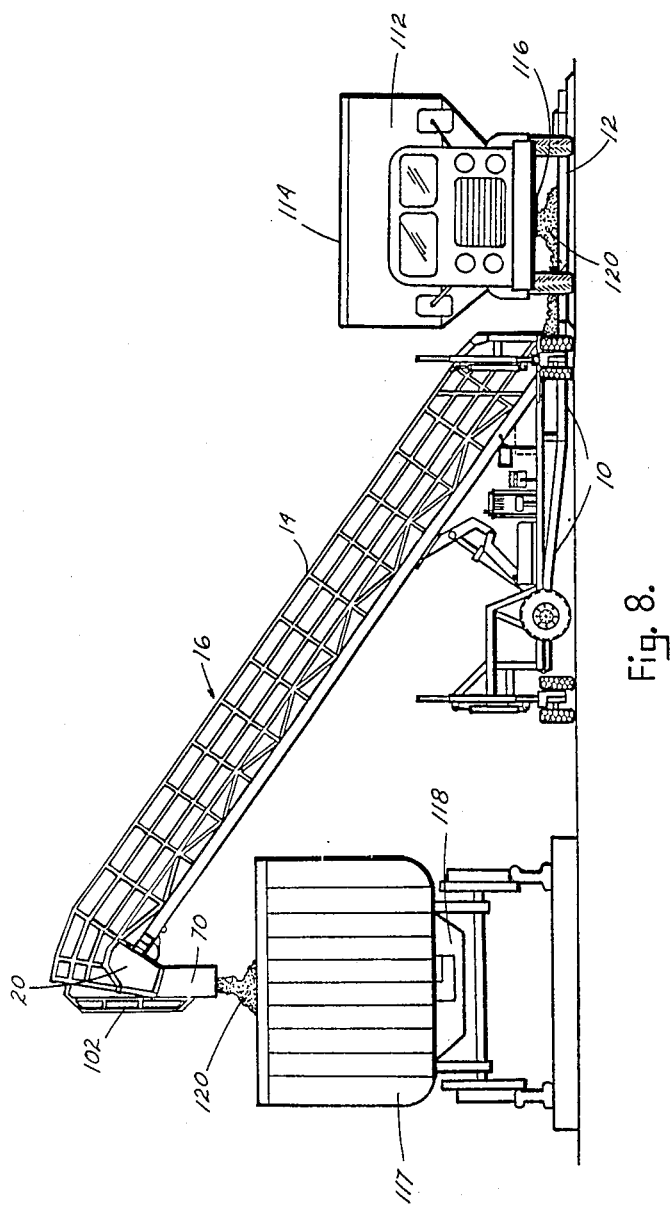
FIG. 8 shows the load conveyer in use with the drive-over ramp positioned under a dump bottom truck and the conveyer elevating bulk materials into a gondola railroad car.
Figure 9:
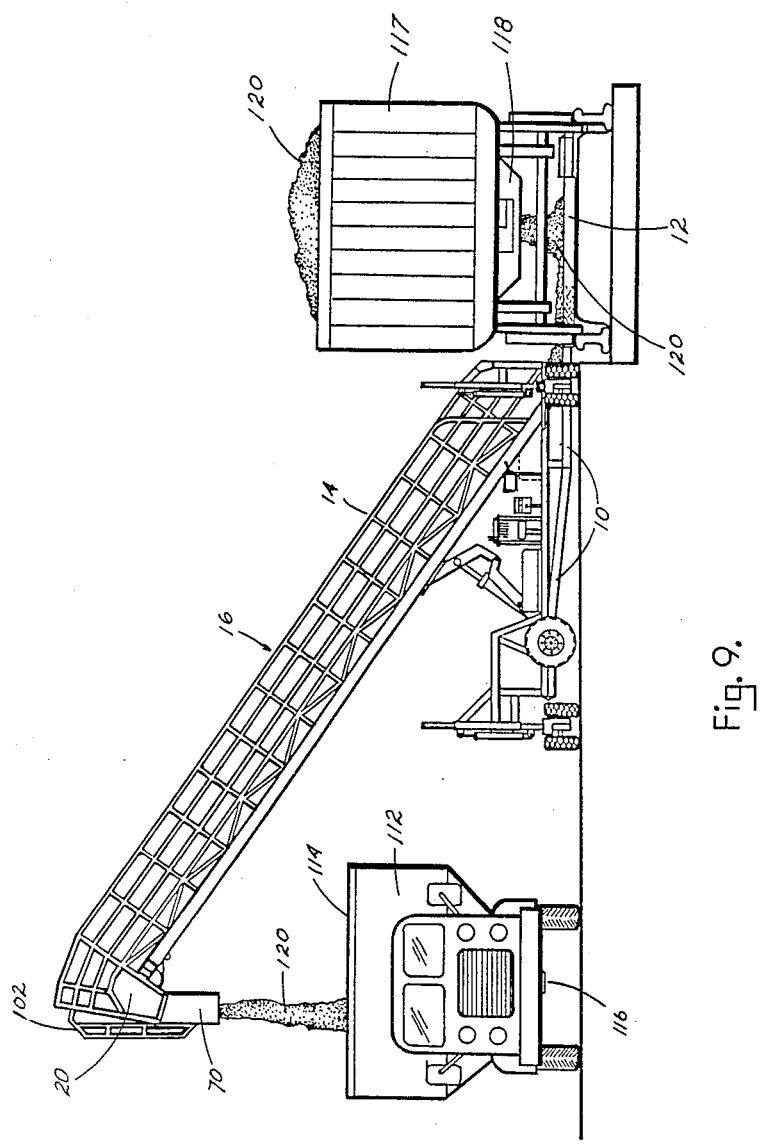
FIG. 9 shows the load conveyer in a use where the drive-over ramp has been backed up under the dump bottom of a gondola railroad car the conveyer is elevating bulk materials into the container of a truck.

As illustrated in FIG. 8, the load conveyer can be used as a drive-over bulk materials 120 receiver from the truck bottom dump chute 116 of bottom dump bulk carrier truck 112 and loaded by elevator 16 into the hopper of bottom dump railroad hopper car 117. Or the ground paralleling drive-over ramp 12 can be backed under bottom dump railroad hopper car 117 so railroad hopper car dump chute 118 is positioned to load bulk materials 120 between ramp receiver side panels 18 onto conveyer belt 22 and be deposited in truck hopper 114 of bottom dump bulk carrier truck 112 as illustrated in FIG. 9. It is noted that the conveyer assemblage of the present invention is highly efficient and cost saving in that controlled by a single operator it can be moved sideways along bottom dump railroad hopper car 117 to reposition drive-over ramp 12 to unload from additional railroad hopper car dump chutes 118 as each section is emptied.

The load conveyer of the present invention is highly portable in that for highway movement from job site to job site, street wheels 48 are lowered by wheel set hydraulic cylinder 50 and the entire conveyer assemblage can be towed by a truck hitched to transportation pull hitch 74.

Although I have described the preferred embodiment of my invention with considerable details in the specification, it is to be understood that I may practice variations in the structure and design so long as changes made do not exceed the intended scope of the appended claims.

What is claimed is:

1. A portable self-powered truck and railroad car load conveyer with movement and elevating mechanics comprising:

a substantially rectangular wheeled main support frame affixed at a terminal end as a part thereof with;

a low profile, ground paralleling drive-over load receiving ramp;

said wheeled main support frame attached pivotally at a load accepting end of a conveyer belted elevating structure;

said elevating structure and said main support frame fitted cooperatively with controlled mechanics for raising and lowering a load discarding end of said elevating structure;

said conveyer belt comprising a strip of suitable belting material having on a conveying surface cleating designs and on a second surface a frictional finish arranged for lagged mating with a similar surface on a hydraulically motored head roller provided at said load discharging end of said elevating structure;

said belting material fastened end-to-end into a continuous loop with said surface having said frictional finish faced inwardly;

there being included cooperatively in said elevating structure and said main frame mechanical means and fixtures for moving said conveyer belt in a continuous loop from an idler roller adjacent the terminal end of said drive-over ramp and said hydraulically motored head roller at said discharge end of said elevating structure with said conveyer belt passing horizontally along the opened top of said drive-over ramp, there being means for movably retaining and supporting said conveyer belt aligning horizontally and longitudinally in said top of said drive-over ramp and in an upwardly material-moving position between side walls under a catwalk covering in said elevating structure, there being return retainers in the underside of said side walls of said elevating structure and the underside of said drive-over ramp providing supportively an unrestricted course for powered circulatory movement of said conveyer belt;

said wheeled main support frame having attached thereto an internal combustion motor powering means and fuel tank for same, a hydraulic pumping means operationally attached to said powering means, a pressure withstanding hydraulic fluid storage tank, a one-operator controlling station with seat, stand, and immediate controls for operating said powering means and control valves functional with the various hydraulic motors, hydraulic cylinders or hydraulic rams required in the operational system, said control valves connected to supply controlled pressurized hydraulic fluid from said hydraulic pumping means to said operational system through tubular circulatory attachments, a part thereof;

said wheeled main support frame affixed with front and rear telescoping superstructure hydraulically operated to raise and lower at least four small dual wheel sets of two tired wheels positioned crosswise to said wheeled main support frame at four apposite corners for sideways movement thereof with two of said dual wheel sets on one side of said wheeled main support frame hydraulically motored for steering and movement and the other two said dual wheel sets positioned on the opposite side of said wheeled main support frame with one set being rigidly affixed thereto and the second set pivotally attached thereto;

said wheeled main support frame further including at least two hydraulically driven tired street wheels for controlling forward and rearward movement and having controllable hydraulically operated lifting mounts for moving the tired street wheels into a down position for ground use of said tired street wheels for heavy duty support, for forward and backward movement, and highway tow transporting of said load conveyer and for moving the tired street wheels into an upwardly retracted position for sideways or circular movements of said load conveyer when said dual wheel sets are in use.

2. The load conveyer of claim 1 wherein said catwalk covering said elevator structure is a flat walkway above and paralleling said conveyer belt and sufficiently raised so as to allow materials to pass thereunder, there being a handrail on both sides therealong with said handrail having bridging members rigidly affixed to both sides of said side walls of said elevating structure as supporting members thereof.

3. The load conveyer of claim 2 wherein an operational utility ladder is affixed at said load discharging end of said elevator as a removable part of said hand railing and said catwalk.

4. The load conveyer of claim 1 wherein said drive-over ramp with said opened top and said conveyer belt passing horizontally therealong has in parallel alignment with said conveyer belt affixed hingedly along both sides of said opened top adjustable ramp receiver side panels with a control arm for raising said side panels into material retaining hopper sides for loading said conveyer belt and for lowering said side panels for drive-over ramp operations.

5. The load conveyer of claim 1 wherein said load discharging end of said elevator is affixed with a downwardly directing curved hood material guide and protecting cover for said hydraulically motored head roller.

6. The load conveyer of claim 5 wherein a dust retarding tubular chute boot is attached at the downwardly faced end of said curved hood material guide.

7. The load conveyer of claim 1 wherein said internal combustion motor powering means is a gasoline or diesel fueled engine.

8. The load conveyer of claim 1 wherein said movement and elevating mechanics are accomplished by said internal combustion motor powering means operational in a closed controllable system including said hydraulic pump, said pressurized hydraulic fluid, said tubular circuitry, said hydraulic motoring for said movement, and said hydraulic cylinders or rams for said elevating mechanics to effectuate said load conveyer being self-powered.

9. The load conveyer of claim 1 wherein said means for movably retaining said conveyer belt is a tired idler wheel bracketed to rotate and wade through conveyed materials at the mouth of said material receiving end of said elevator.

10. The load conveyer of claim 1 wherein said means for supporting said conveyer belt in said top of said drive-over ramp and in an upwardly material moving position in said elevator is a conveyer belt support panel under said conveyer belt in said drive-over ramp and under said conveyer belt between said side walls in said elevator.

11. The load conveyer of claim 1 wherein slide shoes affixed to said side walls of said elevator provide movable retentive positioning to the top edges of said conveyer belt on said conveyer belt support panel.

* * * * *